N. M. ROSENDAHL.
DEVICE FOR LOADING CONCRETE MIXERS.
APPLICATION FILED MAR. 25, 1916.
1,226,261.
Patented May 15, 1917.
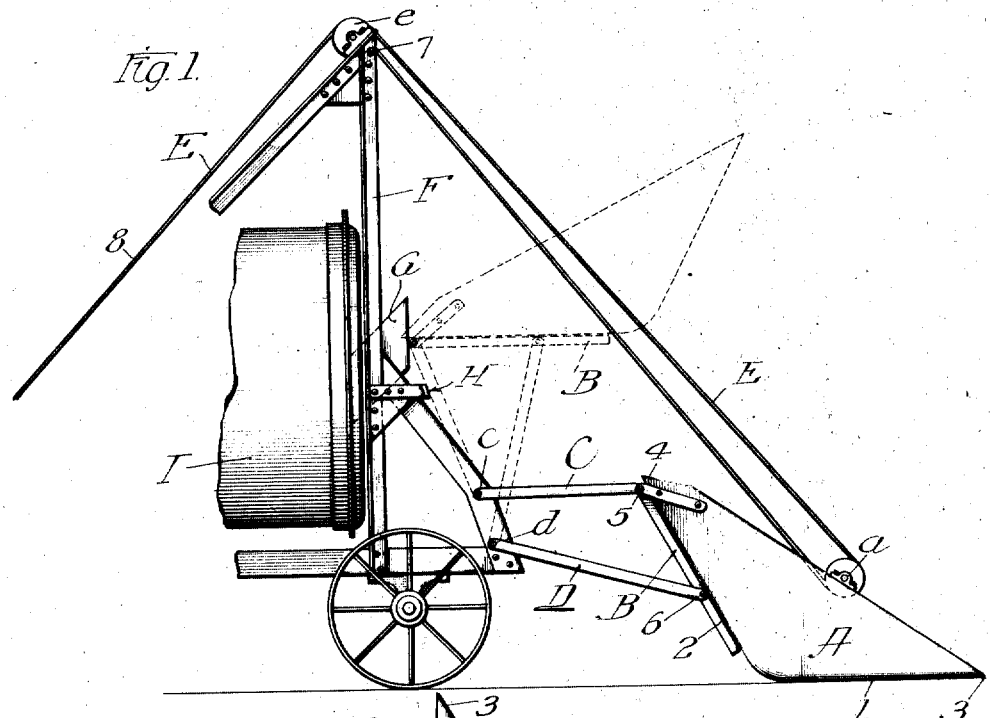
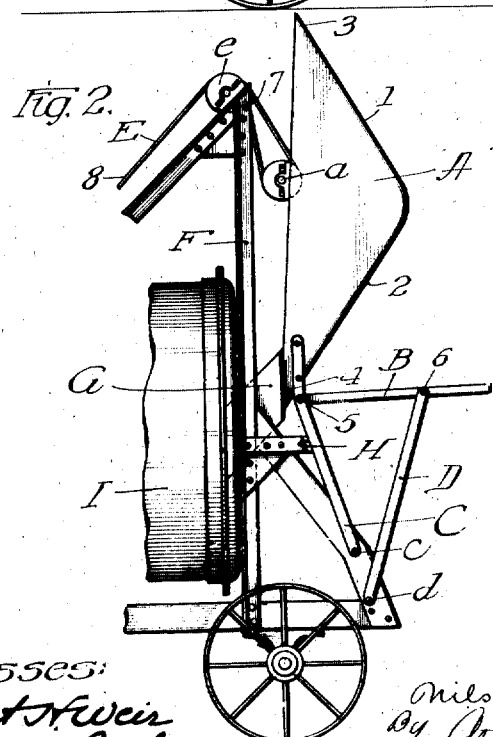

UNITED STATES PATENT OFFICE.

NILS MATHIAS ROSENDAHL, OF WINTHROP HARBOR, ILLINOIS, ASSIGNOR TO FREDERICK C. AUSTIN, OF CHICAGO, ILLINOIS.

DEVICE FOR LOADING CONCRETE-MIXERS.

1,226,261.  Specification of Letters Patent.  Patented May 15, 1917.

Application filed March 25, 1916. Serial No. 86,616.

*To all whom it may concern:*

Be it known that I, NILS M. ROSENDAHL, a citizen of the United States of America, and resident of Winthrop Harbor, Lake county, Illinois, have invented a certain new and useful Improvement in Devices for Loading Concrete-Mixers, of which the following is a specification.

My invention relates to loading apparatus of that kind in which a pan rests on the ground to receive the materials to be mixed, and in which means are provided for then hoisting the pan upward to dump the load into the mixer, the pan being then lowered to the ground to receive another load while the mixer is in operation.

Generally stated, the object of my invention is to provide a device or apparatus of this kind in which the arrangement is such that the pan will be hoisted in carrying position to a point about opposite the inlet of the mixer, and having provisions whereby the pan will then be tilted into extreme dumping position, about an axis immediately in front of said opening, thereby insuring a more satisfactory delivery of the materials to the mixer, inasmuch as the materials will not be as liable to fall out before the pan reaches the inlet, and for the further reason that the final dumping operation prevents any of the materials from remaining in the pan when the latter moves back to the ground to receive another load.

It is also an object to provide certain details and features of construction and combinations tending to increase the general efficiency and desirability of a loading apparatus of this particular character and for this particular purpose.

To this and other useful ends, my invention consists in matters hereinafter set forth and claimed.

In the accompanying drawings:—

Figure 1 is a side elevation of a loading apparatus embodying the principles of my invention, showing the adjacent portion of the mixer in side elevation, and showing the pan in lowered position to receive the load.

Fig. 2 is a similar view showing the pan raised and in final or extreme dumping position.

As thus illustrated, my invention comprises a pan A having inclined lower sides 1 and 2, and having its top provided with a sheave $a$ of any suitable character. This pan has a receiving end 3 and a discharge end 4, and is also provided at its said discharge end with a pivot 5 about which it is tilted into final or extreme dumping position, in the manner shown in Fig. 2. This pivot is located at the forward end of the pan-supporting member B which serves as a platform for the lower side 2 of the pan while the latter is being filled on the ground. The links C and D are pivoted to the framework of the mixer at $c$ and $d$, it being understood that these links are preferably duplicated at the other side of the machine. The other ends of these links are pivoted at 5 and at 6 to the pan-supporting member B, these pivots being a greater distance apart than the pivots $c$ and $d$, and the link or links D being somewhat longer than the link or links C, whereby the member B is in an inclined position while the pan is receiving the load, but is horizontal when the said links and member are raised into the position shown in dotted lines in Fig. 1. The hoisting cable E extends upward and over a sheave $e$ at the top of the mixer-frame F, and then downward and around the sheave $a$, and then upward to its point of attachment at 7 on the said frame. With this arrangement, a downward pull on the portion 8 of said cable E will hoist the pan A into the position shown in dotted lines in Fig. 1, in which the pan-supporting member B is horizontal. A further pull on said cable will then tilt the pan about its axis 5 into the extreme dumping position shown in full lines in Fig. 2, thus dumping the load into the mixer.

Thus, it will be seen that the pan first rises in carrying position, without spilling the load, and that when it arrives in front of the mixer inlet G the axis 5 is directly in front of said inlet, so that this axis then remains stationary during the tilting of the pan into extreme dumping position. Thus the pan has one tilting motion while rising and another or different tilting movement while dumping. To accomplish this, if desired, stops H can be provided for engaging the links C, and for thereby limiting the movement of the links and the member B toward the mixer. The pan tilts into dumping position and discharges the load into the mixer, and this position is such that nothing will remain in the pan, so that no materials will be carried back to the ground. In this way, the pan occupies the position necessary for the loading of the same on the ground, it being understood that the materials will be delivered by wheelbarrows which are pushed by the workmen directly into the pan.

The mixer I can be of any suitable, known or approved form, such as any of the well-known rotary mixers now employed for mixing concrete or other materials.

It will be seen that the links C and D and their pivots are so arranged that when the pan A moves downward its side 1 rests flatwise upon the ground. In this way, the pan does not dig into the ground with its edge 3, when it finally adjusts itself into position for loading, but rests flatwise on the ground surface.

I do not limit myself to the exact construction shown and described.

What I claim as my invention is:—

1. Apparatus for loading the materials into a mixer, comprising a pan having opposite receiving and discharge ends and adapted to rest on the ground to receive the materials, a hoisting connection for raising the pan, and link mechanism for supporting and tilting said pan into carrying position while rising from the ground to the mixer, said mechanism having means for permitting said apparatus to tilt the pan into extreme dumping position without movement of said mechanism after it reaches the inlet of the mixer, so that said pan has one tilting motion while rising and a different tilting motion while dumping.

2. Apparatus for loading the materials into a mixer, comprising a pan having opposite receiving and discharge ends and adapted to rest on the ground to receive the materials, a hoisting connection for raising the pan, and link mechanism for supporting and tilting said pan into carrying position while rising to the mixer, said mechanism having means for permitting said apparatus to tilt the pan into extreme dumping position without movement of said mechanism after it reaches the inlet of the mixer, so that said pan has one tilting motion while rising and a different tilting motion while dumping, said means including a single pivotal connection between said pan and mechanism.

3. Apparatus for loading the materials into a mixer, comprising a pan having opposite receiving and discharge ends and adapted to rest on the ground to receive the materials, a hoisting connection for raising the pan, and link mechanism for supporting and tilting said pan into carrying position while rising to the mixer, said mechanism having means for permitting said apparatus to tilt the pan into extreme dumping position without movement of said mechanism after it reaches the inlet of the mixer, so that said pan has one tilting motion while rising and a different tilting motion while dumping, said means having a single pivot disposed at the discharge end of said pan and forming an axis which is stationary while said pan is tilting into dumping position.

4. Apparatus for loading the materials into a mixer, comprising a pan having opposite receiving and discharge ends and adapted to rest on the ground to receive the materials, a hoisting connection for raising the pan, and link mechanism for supporting and tilting said pan into carrying position while rising to the mixer, said mechanism having means for permitting said apparatus to tilt the pan into extreme dumping position without movement of said mechanism after it reaches the inlet of the mixer, so that said pan has one tilting motion while rising and a different tilting motion while dumping, said means including a support for engaging the bottom of said pan while the latter is rising in carrying position and a pivot between one end of said support and said pan to permit tilting of said pan into dumping position while said support remains stationary in horizontal position.

5. Apparatus for loading the materials into a mixer, comprising a pan having opposite receiving and discharge ends and adapted to rest on the ground to receive the materials, a hoisting connection for raising the pan, and link mechanism for tilting said pan into carrying position while rising to the mixer, said mechanism having means for permitting said apparatus to tilt the pan into extreme dumping position after it reaches the inlet of the mixer, and said mechanism including links pivoted a distance apart on the mixer and a pan-supporting member on which said links are pivoted a greater distance apart to bring said member into an inclined lower position for the loading of the pan and into a horizontal upper position in front of said inlet.

6. Apparatus for loading the materials into a mixer, comprising a pan having opposite receiving and discharge ends and adapted to rest on the ground to receive the materials, a hoisting connection for raising the pan, and link mechanism for tilting said pan into carrying position while rising to the mixer, said mechanism having means for permitting said apparatus to tilt the pan into extreme dumping position after it reaches the inlet of the mixer, and said mechanism including links pivoted a distance apart on the mixer and a pan-supporting member on which said links are pivoted a greater distance apart to bring said member into an inclined lower position for the loading of the pan and into a horizontal upper position in front of said inlet, said means including a single pivot between the said member and the discharge end of said pan.

7. Apparatus for loading the materials into a mixer, comprising a pan having opposite receiving and discharge ends and adapted to rest on the ground to receive the materials, a hoisting connection for raising the pan, and link mechanism for tilting said pan into carrying position while rising to the mixer, said mechanism having means for permitting said apparatus to tilt the pan into extreme dumping position after it reaches the inlet of the mixer, and said mechanism including links pivoted a distance apart on the mixer and a pan-supporting member on which said links are pivoted a greater distance apart to bring said member into an inclined lower position for the loading of the pan and into a horizontal upper position in front of said inlet, said pan having oppositely inclined lower sides, one side to rest on the ground and the other side to rest on said member, and said means including a pivot for connecting together said support and pan and one of said links.

8. Apparatus for loading the materials into a mixer, comprising a pan having opposite receiving and discharge ends and adapted to rest on the ground to receive the materials, a hoisting connection for raising the pan, link mechanism for supporting and tilting said pan into carrying position while rising to the mixer, said mechanism having means for permitting said apparatus to tilt the pan into extreme dumping position without movement of said mechanism after it reaches the inlet of the mixer, so that said pan has one tilting motion while rising and a different tilting motion while dumping, and a stop to engage said mechanism and prevent movement thereof while the pan is tilting into dumping position.

9. Apparatus for loading the materials into a mixer, comprising a pan having opposite receiving and discharge ends and adapted to rest on the ground to receive the materials, a hoisting connection for raising the pan, and link mechanism for supporting and tilting said pan into carrying position while rising to the mixer, said mechanism having means for permitting said apparatus to tilt the pan into extreme dumping position without movement of said mechanism after it reaches the inlet of the mixer, said mechanism having a pan-supporting member which remains stationary in a horizontally disposed position while the pan is tilting thereon into dumping position.

Signed by me at Chicago, Illinois, this 7th day of March, 1916.

NILS MATHIAS ROSENDAHL.